United States Patent
Guering et al.

(10) Patent No.: US 11,407,515 B2
(45) Date of Patent: Aug. 9, 2022

(54) OPTIMIZED MODULE FOR AIRCRAFT COCKPIT

(71) Applicant: Airbus Operations (S.A.S.), Toulouse (FR)

(72) Inventors: Bernard Guering, Montrabe (FR); Laurent Saint-Marc, Montaigut sur Save (FR)

(73) Assignee: Airbus Operations (S.A.S.), Toulouse (FR)

( * ) Notice: Subject to any disclaimer, the term of this patent is extended or adjusted under 35 U.S.C. 154(b) by 609 days.

(21) Appl. No.: 16/524,689

(22) Filed: Jul. 29, 2019

(65) Prior Publication Data
US 2020/0055606 A1    Feb. 20, 2020

(30) Foreign Application Priority Data
Aug. 7, 2018 (FR) ........................ 1857365

(51) Int. Cl.
*B64D 13/06* (2006.01)
*B64F 5/10* (2017.01)
(Continued)

(52) U.S. Cl.
CPC ............ *B64D 13/06* (2013.01); *B64C 1/1476* (2013.01); *B64D 43/00* (2013.01); *B64F 5/10* (2017.01);
(Continued)

(58) Field of Classification Search
CPC .............................. B64D 13/06; B64D 43/00; B64D 2013/0625; B64D 2013/0662; B64D 13/08; B64C 1/1476; B64F 5/10
See application file for complete search history.

(56) References Cited

U.S. PATENT DOCUMENTS

| 6,170,274 B1 * | 1/2001 | Ichishi | B60H 1/247 |
| | | | 454/313 |
| 2005/0046164 A1 * | 3/2005 | Arnold | B29C 39/10 |
| | | | 280/751 |

(Continued)

FOREIGN PATENT DOCUMENTS

| CA | 2889085 A1 * | 1/2016 | ............. B64C 1/061 |
| CN | 106494624 A * | 3/2017 | ............. B64D 13/06 |

(Continued)

OTHER PUBLICATIONS

French Search Report for Application No. 1857365 dated Apr. 25, 2019.

*Primary Examiner* — Behrang Badii
*Assistant Examiner* — Jalal C Coduroglu
(74) *Attorney, Agent, or Firm* — Jenkins, Wilson, Taylor & Hunt, P.A.

(57) ABSTRACT

To facilitate assembly of an aircraft cockpit, a cockpit module includes an instrument panel to support at least one screen and an air conditioning distribution block bordering the instrument panel and integral with a rear face of it. The air conditioning distribution block includes an air distributor, an excess air collector, and air distribution channels each including a first end communicating with the air distributor and a second end communicating with the excess air collector, each distribution channel being equipped with an air outlet arranged between its first and second ends.

16 Claims, 7 Drawing Sheets

(51) Int. Cl.
 *B64C 1/14* (2006.01)
 *B64D 43/00* (2006.01)
(52) U.S. Cl.
 CPC .............. *B64D 2013/0625* (2013.01); *B64D 2013/0662* (2013.01)

(56) References Cited

U.S. PATENT DOCUMENTS

| 2014/0209740 | A1* | 7/2014 | Guering | B60R 11/0229 |
| | | | | 361/679.01 |
| 2016/0244171 | A1* | 8/2016 | Ishida | B64D 13/08 |
| 2020/0055606 | A1* | 2/2020 | Guering | B64D 13/08 |

FOREIGN PATENT DOCUMENTS

| DE | 19956259 A1 * | 6/2000 | ......... B60H 1/00742 |
| DE | 102016102800 A1 * | 8/2017 | ............ B64D 13/06 |
| EP | 1 323 555 A1 | 7/2003 | |

\* cited by examiner

OPTIMIZED MODULE FOR AIRCRAFT COCKPIT

CROSS-REFERENCE TO RELATED APPLICATION

This application claims the benefit of and priority to French patent application number 18 57365 filed on Aug. 7, 2018, the entire disclosure of which is incorporated by reference herein.

TECHNICAL FIELD

The disclosure herein relates to the field of the assembly of the different components of an aircraft. It more specifically relates to the cockpit of an aircraft, and the assembly of its different items of equipment.

The disclosure herein preferably applies to commercial aircraft.

BACKGROUND

The cockpit of an aircraft is conventionally delimited by a framework that forms its structural part. Items of equipment are fastened to this cockpit framework, such as for example an instrument panel, also called "MIP" (Main Instrument Panel).

The cockpit is also equipped with many components belonging to an air conditioning system, and whose assembly on the cockpit framework engenders a long assembly time.

This assembly time devoted to the assembly of the components of the air system onto the cockpit framework adds to that required for assembling all the other components of the cockpit, such as systems, fittings, etc.

Furthermore, the overall duration of assembling the cockpit is affected by the difficult access to the fastening points of certain components on the framework. In fact, these fastening points are sometimes located in dense areas, complicating interventions for the operators.

The production rates of the aircraft thus remain perfectible.

A need for optimization of the design of aircraft cockpits consequently exists so as to facilitate their assembly.

SUMMARY

In order to respond at least partially to this need, a subject of the disclosure herein first of all is a module for aircraft cockpit, the module comprising an instrument panel intended to support at least one screen, and further comprising an air conditioning distribution block bordering this instrument panel and integral with a rear face of same, the air conditioning distribution block comprising:

an air distributor;
an excess air collector;
a plurality of air distribution channels each including a first end communicating with the air distributor and a second end communicating with the excess air collector, each distribution channel being equipped with an air outlet arranged between its first and second ends.

The disclosure herein thus breaks with the prior art by bringing the air conditioning distribution block to the instrument panel, so as to form a single module. The assembly of the cockpit comprising such a module is thereby simplified, since the number of elements to install on the cockpit framework is advantageously reduced. Moreover, with the air conditioning distribution block bordering and being integral with the rear face of the instrument panel, these two components self-stiffen. This results in an optimized overall weight and size for the module, consequently with greater ease of assembly contributing to improving production rates even more.

The disclosure herein preferably provides at least one of the following optional technical characteristics, taken in isolation or combined.

The air outlet of at least one of the air distribution channels is equipped with an airflow control valve.

The air outlet of at least one of the air distribution channels is connected to a coupling, same being preferably equipped with an air diffuser and/or an air heater.

The air conditioning distribution block is configured to ensure at least one of the following functions, and preferably a plurality of same, and even more preferably all of same:

ventilation towards one or both of the pilot's feet;
ventilation towards the upper trunk and/or the head of the pilot;
demisting of a windshield front pane;
demisting of one or more windshield lateral panes.

The air distributor of the block and the excess air collector are adjacent to two lateral ends of the instrument panel, respectively.

The air distribution channels are stacked on top of each other along a direction of the height of the instrument panel, and arranged between the air distributor and the excess air collector.

Each air distribution channel has a curve substantially locally identical to a curve of the instrument panel.

The module includes a heat insulation cover of the air distribution block, same being enclosed between the instrument panel and the heat insulation cover.

The heat insulation cover supports at least one air diffuser associated with at least one of the air distribution channels.

The heat insulation cover supports at least one motor for actuating at least one airflow control valve associated with at least one of the air distribution channels, each motor preferably being supported at an upper portion of the heat insulation cover.

The module includes an air intake port coupled with the air distributor, and an excess air outlet port coupled with the excess air collector.

The instrument panel and the air distribution block are made of a single piece.

The module includes at least one screen supported by the instrument panel, the screen preferably being a screen with organic light emitting diodes.

A further subject of the disclosure herein is an aircraft cockpit comprising a framework and such a module fastened onto the cockpit framework, preferably onto a structural windshield frame.

A further subject of the disclosure herein is an aircraft comprising such a cockpit.

It preferably comprises a forward lower compartment situated under a cockpit floor and under a passenger cabin floor, the forward lower compartment housing electrical cabinets arranged at the rear with respect to an aft cockpit wall, and the configuration is such that the air escaping from the excess air collector of the cockpit module is fed into the forward lower compartment.

Finally, a subject of the disclosure herein is a method for assembling such a cockpit, comprising a step of fastening the module onto the cockpit framework.

Other advantages and characteristics of the disclosure herein will emerge in the non-limitative detailed description below.

BRIEF DESCRIPTION OF THE DRAWINGS

This description will be made with reference to the attached drawings, among which.

DETAILED DESCRIPTION

Figure 1:
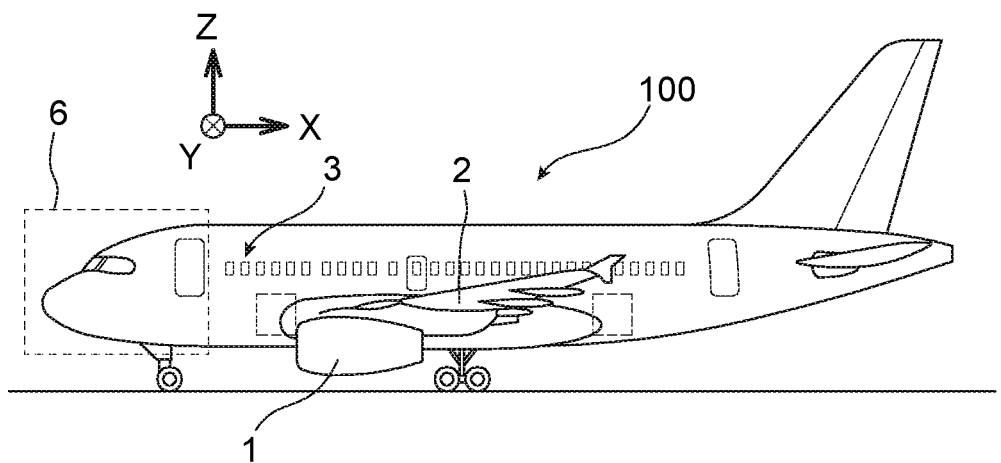
FIG. 1 illustrates a plan side view of an aircraft according to the disclosure herein.
Figure 2:
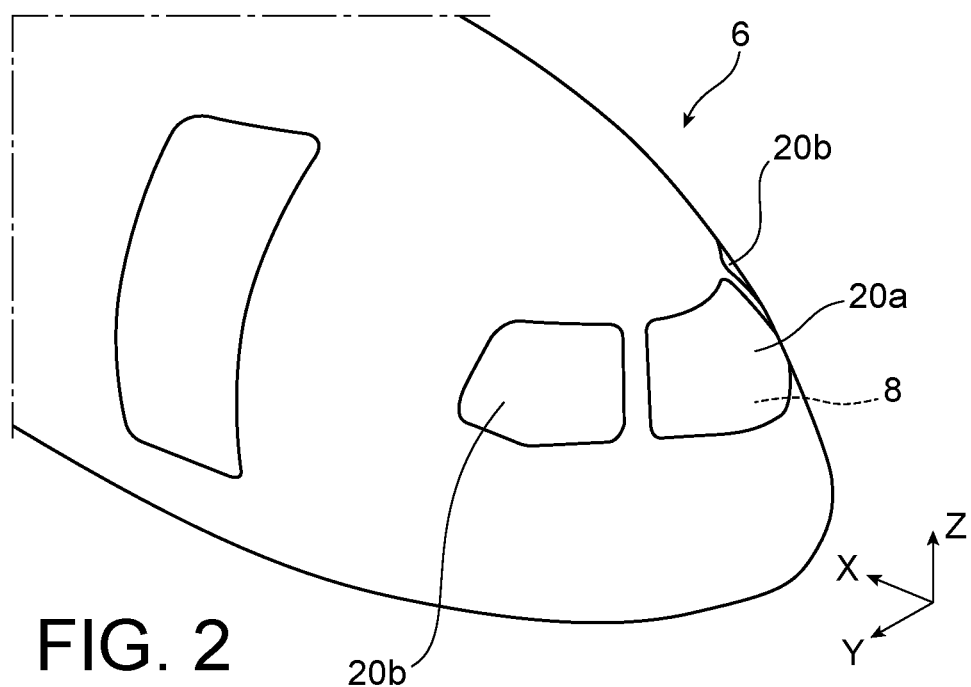
FIG. 2 illustrates a perspective view of the nose of the aircraft shown on the preceding figure.

With reference to FIG. 1, an aircraft 100 of the commercial aircraft type is illustrated, comprising two wings 2 (only one visible on FIG. 1), fastened to a fuselage 3 and each supporting a turbine engine 1 of the ducted fan type, such as a turbojet.

On this aircraft 100, a nose 6 is provided that is specific to the disclosure herein, and a preferred embodiment of which will now be described with reference to the following figures.

In all of the description that will follow, by convention, the direction X corresponds to the longitudinal direction of the aircraft, this direction also corresponding to the longitudinal direction of the nose 6, and to that of the cockpit 8 defined by this nose. On the other hand, the direction Y corresponds to the lateral or transverse direction of the aircraft, this direction also corresponding to the lateral direction of the nose 6, and to that of the cockpit 8. Finally, the direction Z corresponds to the vertical direction or direction of the height, these three directions X, Y, Z being orthogonal with respect to each other. Furthermore, the terms "forward" and "aft" are to be considered with respect to a direction of travel of the aircraft, further to the thrust of the turbine engines.

On FIGS. 2 through 5, the nose 6 of the aircraft is illustrated in greater detail, and in particular its cockpit 8, which has the particularity here of having a volume rather reduced compared with the conventional solutions. In particular, it provides a pilot's seat 10 centered inside the cockpit along the direction Y to accommodate the pilot, and a co-pilot's seat 12 offset from the pilot's seat 10 aft along the direction X and to the right along the direction Y. The reduction of the volume of the cockpit is motivated by reasons of economy, namely by the wish to increase the volume of the passenger compartment.

Figure 3:
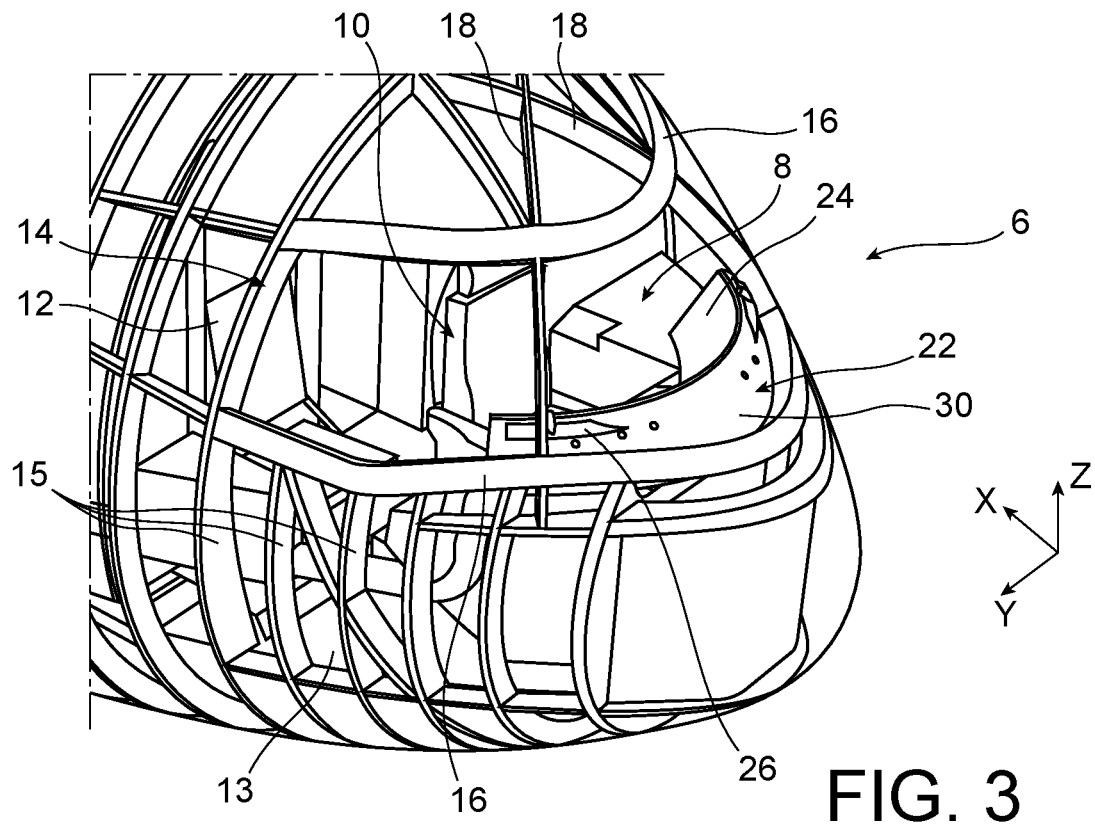
FIG. 3 illustrates a perspective view similar to that of FIG. 2, with the fuselage skin removed to improve the legibility of the figure.
Figure 4:
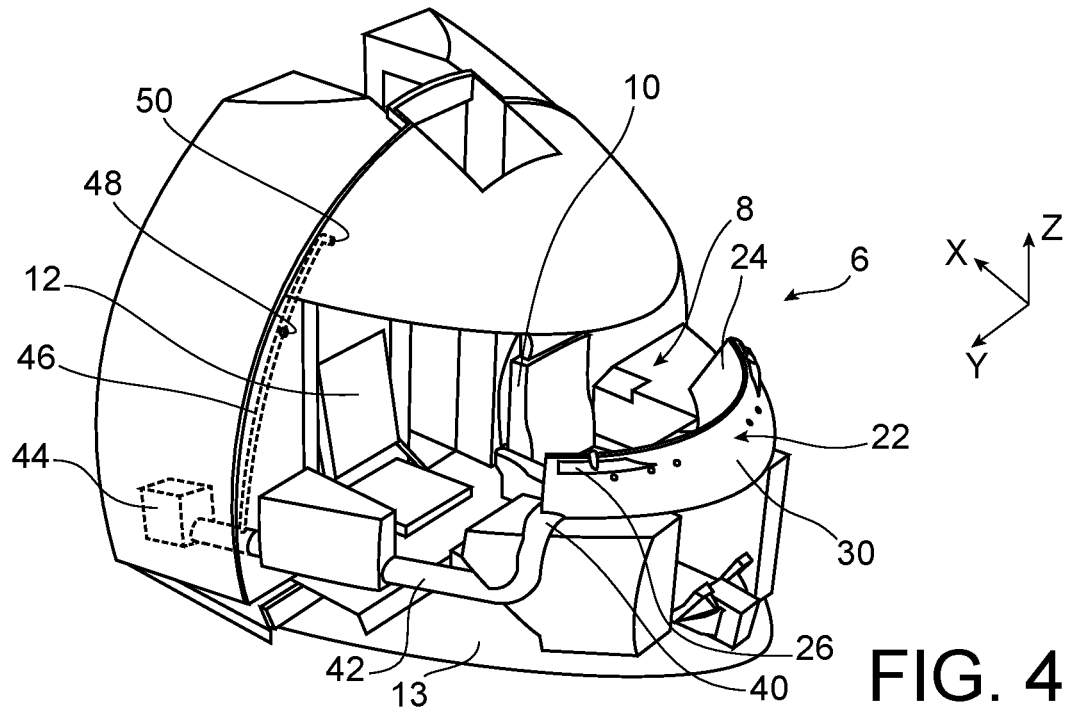
FIG. 4 illustrates a perspective view similar to that of FIG. 3, with the cockpit framework removed for even better legibility.
Figure 5:
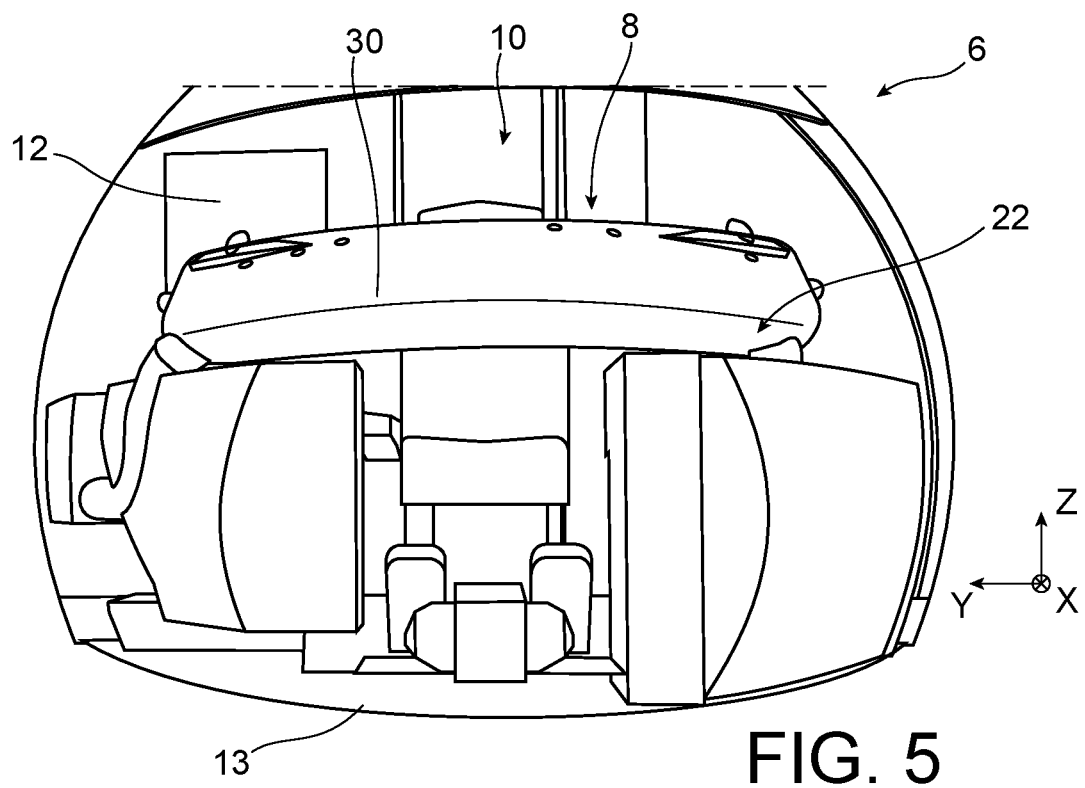
FIG. 5 illustrates a front view of that shown on FIG. 4.

The cockpit 8 is delimited in part by a cockpit floor 13, and by a framework 14 visible in FIG. 3, which is an integral part of the fuselage of the nose 6. This framework 14 comprises transverse frames 15, some interrupted by a windshield zone including a windshield structural frame. This windshield frame is formed by two upper and lower frames 16, arranged substantially in planes XY and following the profile of the nose in general ogive shape. It also comprises lateral frames 18 connecting the two frames 16 and extending beyond same. At the rear, this windshield frame is completed by one of the transverse frames 15. The windshield structural frame 16, 18 is preferably configured to accommodate only three panes shown on FIG. 2, namely a front windshield pane 20a centered along the direction Y and two lateral panes 20b arranged either side of the pane 20a along this same direction.

One of the particularities of the disclosure herein resides in the installation of an innovative module inside the cockpit. This module, referenced 22 on the figures, is provided to integrate several functions while forming a single and unique assembly assembled on the framework 14 of the cockpit using conventional means. More precisely, the module 22 is preferably fastened onto the lower frame 16 of the windshield structural frame, for example at only three or four fastening points, distributed along this frame 16. The step of fastening the module 22 onto the windshield structural frame thus proves to be particularly simple to implement, resulting in a reduction of the time for assembling the cockpit, and an improved production rate of the aircraft.

Principally, the module 22 comprises an instrument panel 24, an air conditioning distribution block 26, and a heat insulation cover 30 of the block 26. It can comprise other elements, such as one or more screens intended to be supported on the front face of the instrument panel, this/these screens (not illustrated on FIGS. 2 through 5) preferably being screens with organic light emitting diodes, called OLED screens. These screens are low in thickness and do not diffuse heat or only very little. It is therefore not necessary to provide hot air extraction. Their size is also reduced, likewise their electric cable requirements, which contributes to the compactness of the module and its ability to integrate other elements while preserving a reasonable overall size.

Alternatively, the screen(s) can be added later to the instrument panel, after fastening the module onto the windshield structural frame, without departing from the framework of the disclosure herein.

Among the other components susceptible of being integrated to the module 22, for example air diffusers or airflow control valves are noted, as will be described subsequently.

With reference now to FIGS. 6 through 10, the module 22 is shown in greater detail. The instrument panel 24 and the air distribution block 26 can be made separately, and fastened together before assembling the module in the cockpit. In this case, the instrument panel 24 preferably adopts the form of a sandwich panel. The two elements 24, 26 are fastened together, for example using clips. Alternatively, these two elements 24, 26 are made in a single piece, that is to say monobloc. For example, this single piece is made by low-pressure injection of resin, or by 3D printing. The heat insulation cover 30 is preferably added to this monobloc assembly, or made in a single piece with same.

Figure 6:
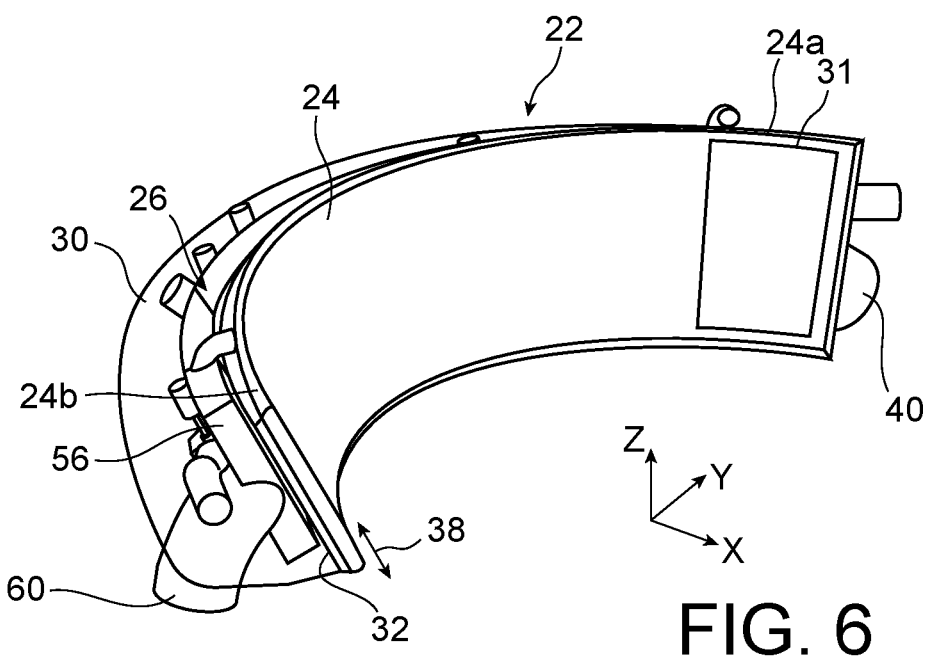
FIG. 6 illustrates a perspective view of a module according to the disclosure herein, equipping the cockpit of the nose shown on the preceding figures.
Figure 7:
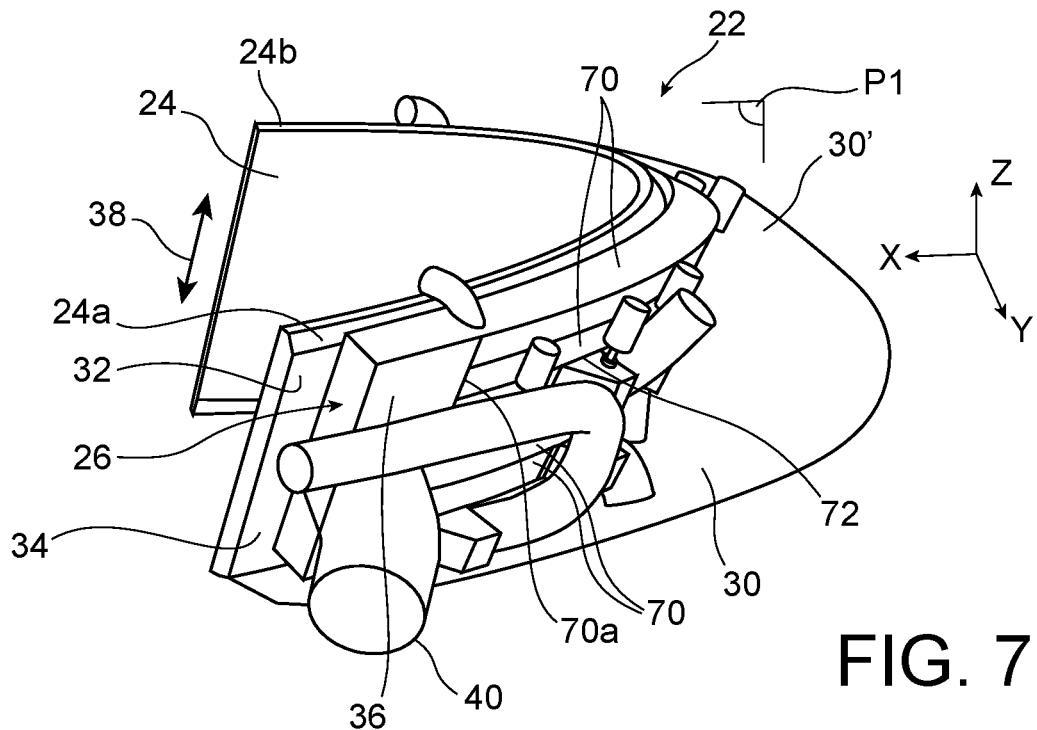
FIG. 7 illustrates a perspective view of the module similar to the preceding one, along another viewing angle.
Figure 8:
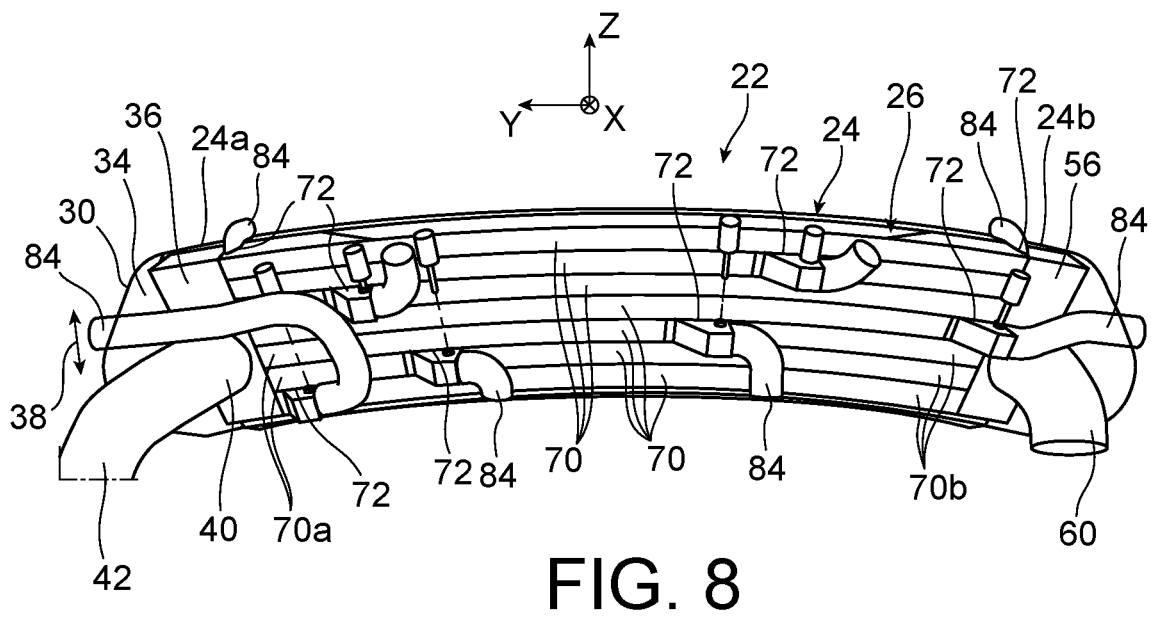
FIG. 8 is a front view of those shown on FIGS. 6 and 7.

In any case, the block 26 is integral with a rear face 32 of the instrument panel 24, and borders this same panel, accommodating at least one OLED screen 31 schematized in FIG. 6. The panel 24 adopts a general truncated cone angular sector shape, while being intended to be centered in the cockpit along the direction Y. Due to the truncated cone shape of this panel 24, same presents a curve around the direction Z. However, a double curve could be provided within the instrument panel 24, without departing from the framework of the disclosure herein.

The air distribution block 26 has a general shape identical or similar to that of the panel it borders over a large part of the length of same, perhaps over substantially the same length. The block 26, therefore in turn adopting a general truncated cone angular sector shape, has a substantially constant and rectangular section. In the preferred case of a monobloc embodiment, the long rear side of this rectangle thus merges with the rear face 32 of the instrument panel 24, as can best be seen on FIG. 9. The thickness of the block 26 is greater than that of the instrument panel 24, but sufficiently slight for this block to be able to be enclosed in a space 34 arranged between the panel 24 and the heat insulation cover 30. This enclosing is total or partial. In the described and illustrated preferred embodiment, only two opposite upper lateral ends of the block 26 are arranged outside the space 34.

The cover 30 also follows the curve of the elements 24, 26 around the direction Z, and has a general C shape section open to the rear. The two ends of the C are thus connected respectively to the lower and upper edges of the instrument panel 24.

The air conditioning distribution block 26 first of all includes an air distributor 36, adjacent to a right lateral end 24a of the instrument panel 24. The distributor 36 has a substantially parallelepiped shape, extending in the direction 38 of the height of the panel. This distributor 36 is connected to an air intake port 40, for example of circular section and provided to deliver the cool air into the distributor. The port 40 is preferably an integral part of the module 22 before its assembly in the cockpit, although integration subsequent to this assembly is possible without departing from the framework of the disclosure herein. The port 40 has a first end connected to a rear opening provided on the distributor 36, then passes through the space 34 and the cover 30 to emerge at a second end arranged outside the module. This second end of the air intake port 40 is connected to an air delivery pipe 42 visible on FIG. 4, in turn supplied with air in a conventional manner by an item of equipment 44 known per se. This pipe 42 furthermore supplies air to another pipe 46 extending upwards along the framework of the cockpit 8. This other pipe supports outlet ports or diffusers 48, 50 intended to direct air conditioning air towards the seat 12 to cool the co-pilot, and to introduce air from an upper zone of the cockpit so as to generate air conditioning called "ambient".

The air delivery pipe 42 is preferably connected to the second end of the air intake port 40 of the module 22 after assembly of same in the cockpit. In other words, this air delivery pipe 42 is preferably not integrated with the module 22, but connected to same in the cockpit.

Similarly, the air conditioning distribution block 26 also includes an excess air collector 56, adjacent to a left lateral end 24b of the instrument panel 24. The collector 56 has a substantially parallelepiped shape, extending in the direction 38 of the height of the panel. This collector 56 is connected to an excess air outlet port 60, for example circular in section and provided to extract the unused cool air out of the collector 56.

The port 60 is preferably an integral part of the module 22 before its assembly in the cockpit, although integration subsequent to this assembly is possible without departing from the framework of the disclosure herein. The port 60 has a first end connected to a rear opening provided on the collector 56, then passes through the space 34 and the cover 30 to emerge at a second end arranged outside the module.

Figure 14:
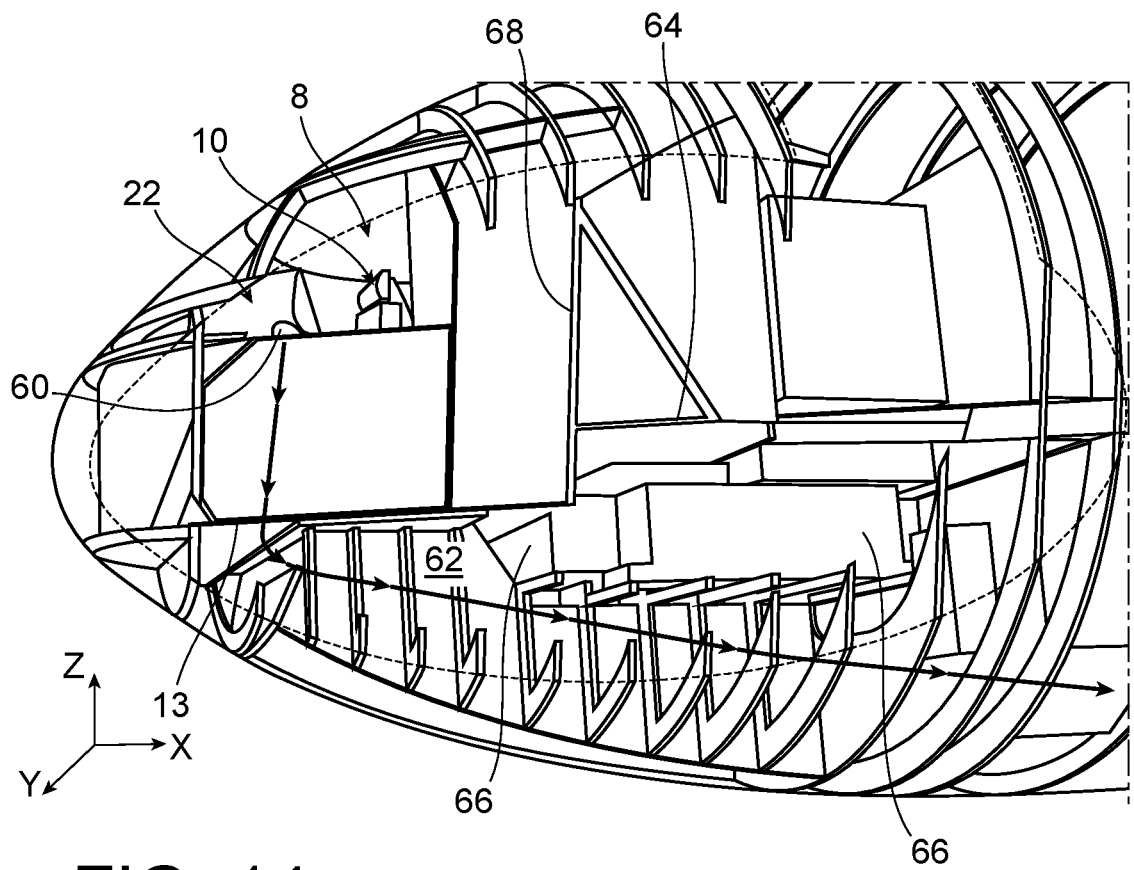
FIG. 14 illustrates a perspective view similar to that of FIG. 3, along another viewing angle.

This second end of the excess air port 60 is either free, or coupled with an evacuation port (not illustrated). In either case, it is preferably done such that this excess air is introduced into a forward lower compartment of the nose, this compartment being referenced 62 in FIG. 14. It is a compartment 62 situated under the cockpit floor 13 and under a passenger cabin floor 64 that houses electrical cabinets 66 placed at the rear with respect to an aft cockpit wall 68. As an indication, it is noted that in certain previous solutions, this compartment 62 has a larger volume allowing an installation of the cabinets 66 and other items of equipment further forward inside this compartment. The shrinkage of this nose therefore results in certain items of equipment being shifted aft in the compartment 62 or in considering moving them to other parts of the aircraft. Consequently, by integrating the block 26 in the cockpit module 22, the disclosure herein brings a satisfactory solution to the problem of housing the air conditioning distribution systems of the prior art, a large part of whose components was arranged in the larger volume compartment 62, under the cockpit floor.

Returning to FIGS. 6 through 10, the air conditioning distribution block 26 includes a plurality of air distribution channels 70, provided in a number for example between four and ten. These channels 70, substantially square or rectangular in section, are stacked on top of each other along the direction 38 of the height of the instrument panel 24, whose rear face 32 they border. Furthermore, each channel 70 resides in a plane XY, having a curve substantially identical, locally, to the curve of the instrument panel 24 around the direction Z. This arrangement allows the panel 24 to be stiffened by the channels 70, the distributor 36 and the collector 56, along with the block 26 being stiffened in turn by the adjacent panel 24. This results in an optimized global weight and size for the module 22, and consequently a greater ease of assembly, contributing to further improving the production rates.

Figure 9:
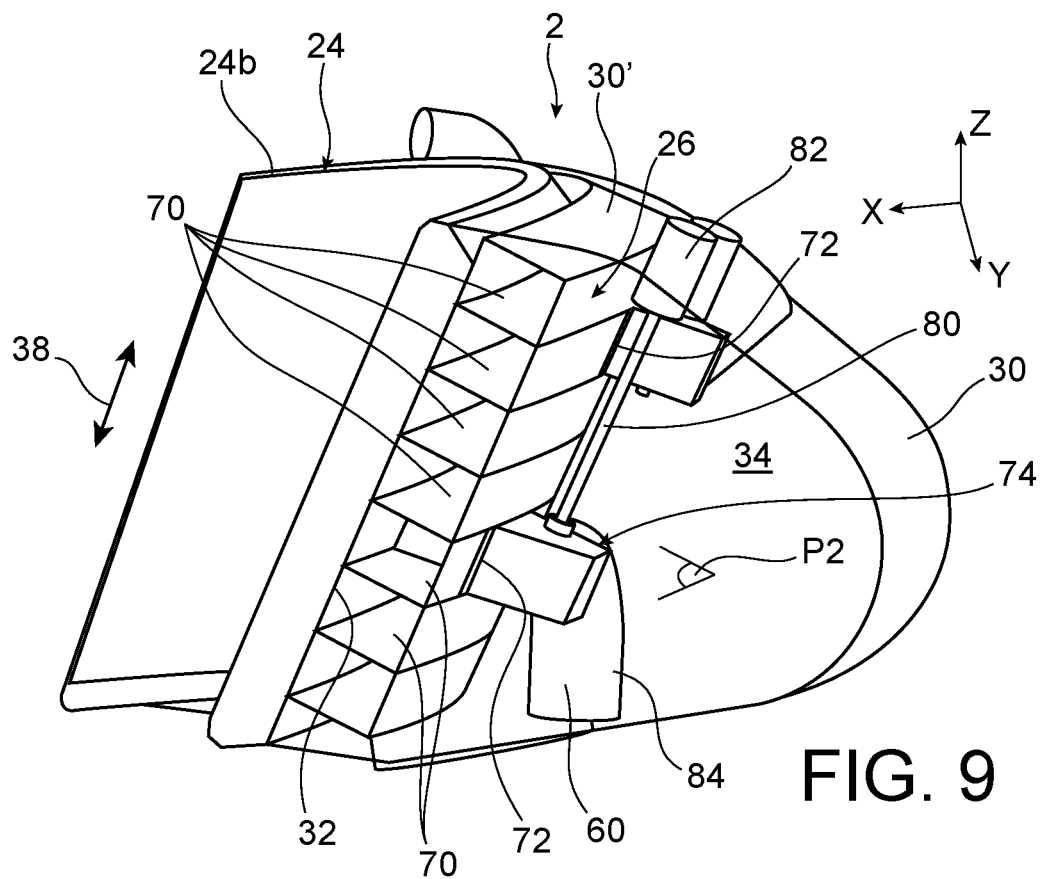
FIG. 9 is a perspective view of the module shown on FIG. 7, intersected by a plane P1 of same.

In the preferred case of a monobloc embodiment, the rear side of each air distribution channel 70 merges with the rear face 32 of the instrument panel 24, as can best be seen on FIG. 9.

The channels 70 extend lengthwise between the distributor 36 and the collector 56, each including a first end 70a communicating with the air distributor 36, and a second end 70b communicating with the excess air collector 56. Moreover, each channel 70 is equipped with an air outlet 72 arranged between its first and second ends 70a, 70b. As can perfectly be seen on FIG. 8, the outlets 72 of the different channels 70 are spaced from each other in the direction of the length of the block 26 going from its distributor 36 to its collector 56.

Figure 10:
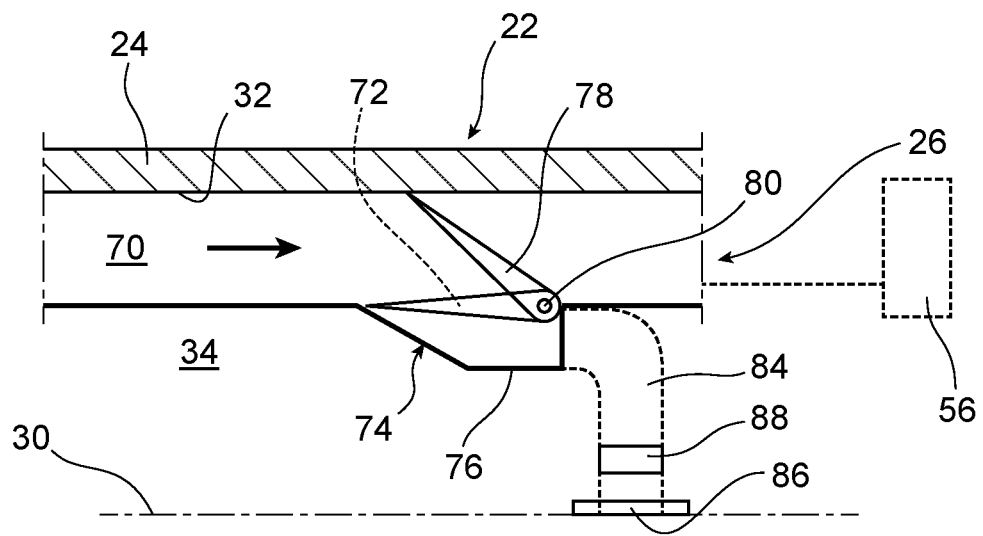
FIG. 10 is a sectional view of the module sectioned along the plane P2 of FIG. 9.

One of the outlets 72 will now be described more specifically with reference to FIGS. 9 and 10. This outlet 72 adopts for example the shape of a simple opening through the front panel of the channel 70 concerned. It can be equipped with an airflow control valve 74, including a forward-looking protuberance 76 forming an integral part of the block 26. The valve 74 also includes a deflector 78 rotationally controlled by a control rod 80, controlled in turn by a motor 82. Depending on the angular position of the deflector 78 (two positions schematized on FIG. 10), the airflow escaping through the outlet 72 varies. In an intermediate position of the deflector 78 (not illustrated), a part of the airflow circulating upstream in the channel 70 is directed towards the outlet 72, while the other part of the flow continues on its way in the channel 70 to the excess air collector 56.

The outlet 72 is preferably also connected to a coupling 84, flexible or rigid, one of whose ends is preferably coupled onto the protuberance 76 of the valve 74 equipping the outlet, and whose other end can be equipped with an air diffuser 86 and/or an air heater 88 so as to adjust the temperature to the desired setpoint. In at least certain cases, the diffuser 86 equipping the end of the coupling 84 can be supported by the cover 30 as schematized in FIG. 10.

Figure 11:
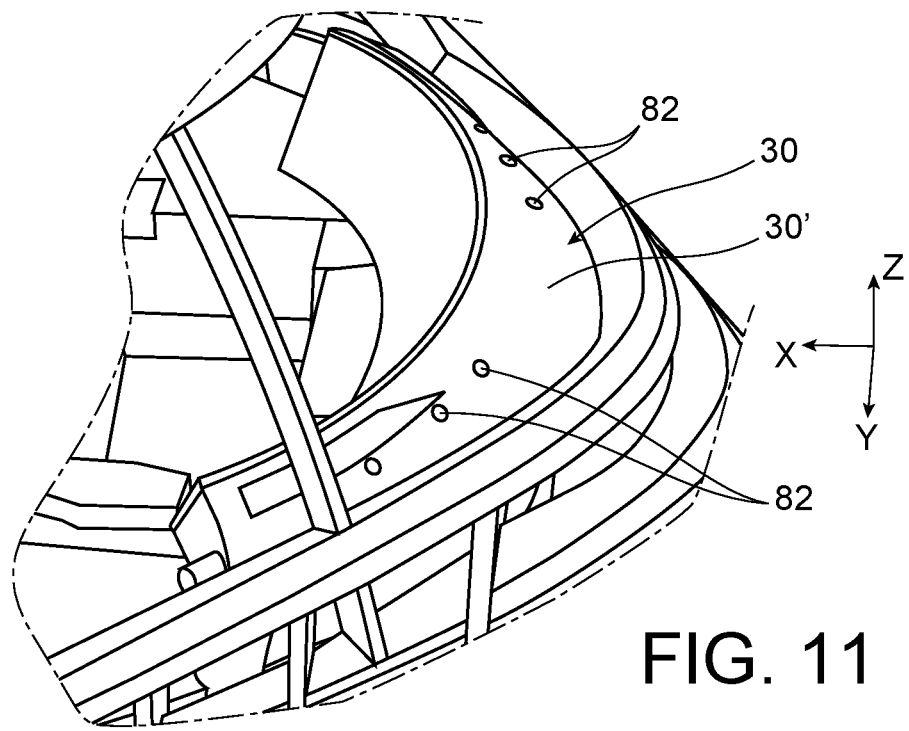
FIG. 11 illustrates a partial magnified view of that of FIG. 3.

The valves 74, the diffusers 86 and the heaters 88 are thus integrated to the module 22 before its assembly in the cockpit. So as to facilitate the maintenance of the motors 82 of the valves 74, these motors are also supported by the cover 30, at an upper portion 30' of this cover as can be seen on FIG. 11. They are hence easily accessible to the operators, and these motors 82 can be disassembled/assembled for example by a single quarter turn movement, thanks to a bayonet or equivalent connection between each motor 82 moved upwards, and the upper portion 30' of the cover.

As reference more specifically, an embodiment example will be described with seven stacked channels 70, each having a different function. These functions will now be described, starting with the highest channel to the lowest channel in the stack.

The first channel 70 includes two outlets 72, arranged respectively at the ends of same. These two outlets 72 are each equipped with a coupling 84 orienting the air towards the upper trunk and/or the head of the pilot. They can be equipped with a heater 88 and/or a diffuser, as has been shown on FIG. 10. It is noted that for this first channel, the couplings 84 are arranged entirely outside the space 34, since their associated outlets 72 are preferably not covered by the heat insulation cover 30.

Figure 12:
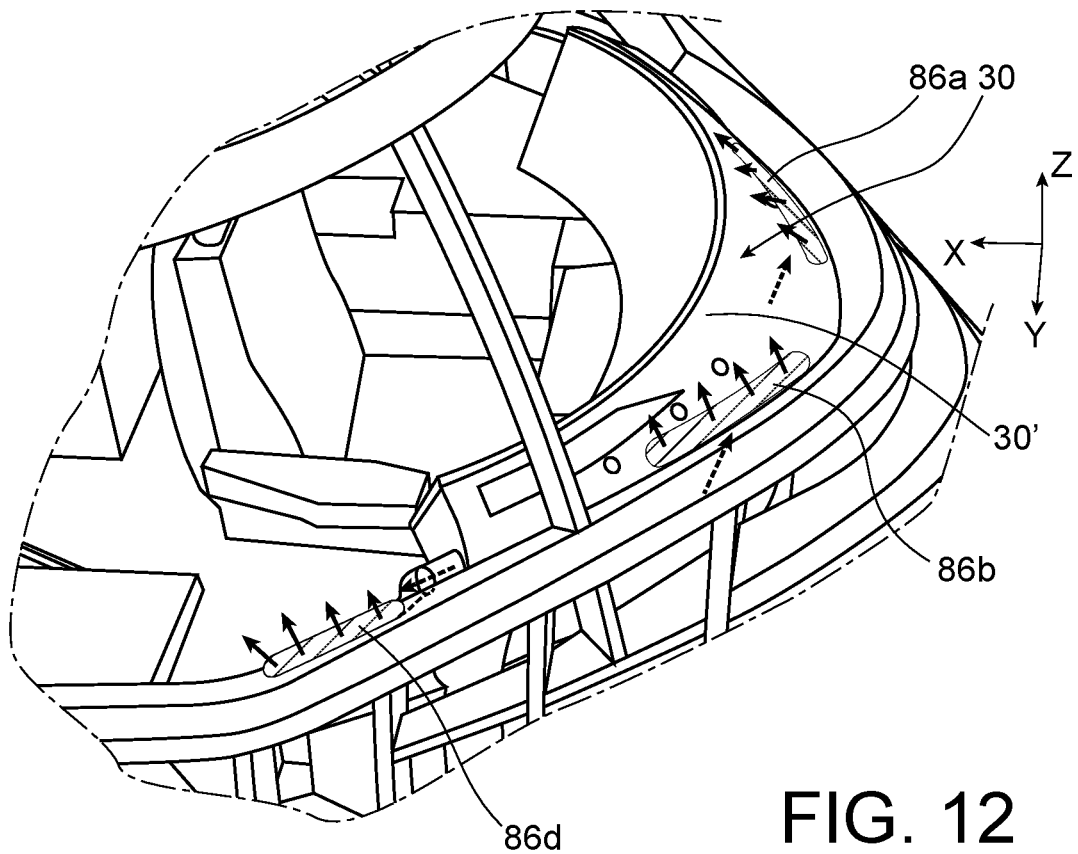
FIG. 12 illustrates a view similar to the preceding one, also showing air diffusers.

The second channel 70 includes an outlet 72 equipped with a coupling 84, at the end of which there is a diffuser 86a, illustrated on FIG. 12. This diffuser 86a, preferably integrated with the module 22 before its assembly in the cockpit, is situated on the upper portion 30' of the cover 30. The air that is extracted from this diffuser 86a is devoted to demisting the left part of the front windshield pane.

Similarly, the third channel 70 includes an outlet 72 equipped with a coupling 84 at the end of which there is a diffuser 86b, illustrated on FIG. 12. This diffuser 86b, preferably also integrated with the module 22 before its assembly in the cockpit, is situated on the upper portion 30' of the cover 30. The air that is extracted from this diffuser 86b is devoted to demisting the right part of the front windshield pane.

Figure 13:
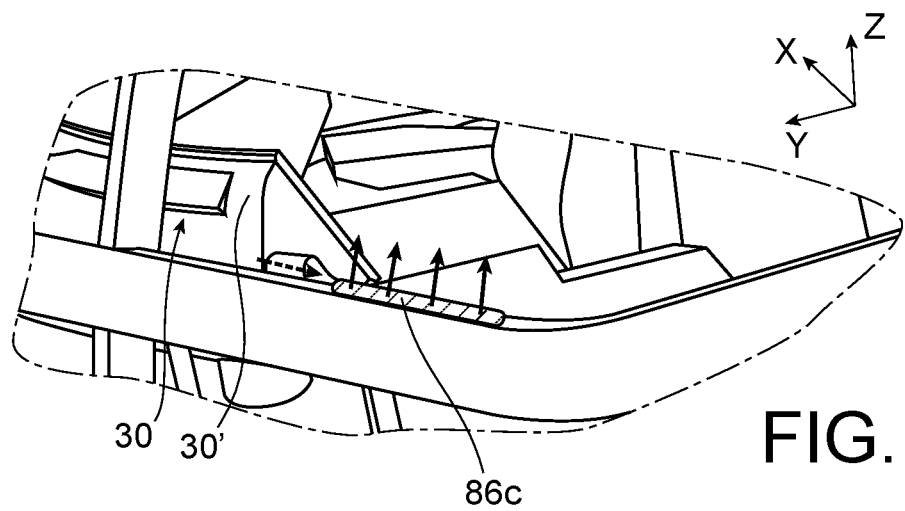
FIG. 13 illustrates a perspective view similar to the preceding one, along another viewing angle.

The fourth channel 70 includes an outlet 72 equipped with a coupling 84 passing through a lateral end of the module 22, and at the end of which there is a diffuser 86c, illustrated in FIG. 13. This diffuser 86c, preferably added after the assembly of the module 22 in the cockpit, is situated left of this module, being fastened to the cockpit framework. The air that is extracted from this diffuser 86c is devoted to demisting the left lateral windshield pane.

The fifth channel 70 includes the outlet 72 already described with reference to FIGS. 9 and 10. The air that is extracted from the diffuser 86 is devoted to ventilation towards the pilot's left foot. Similarly, the air that is extracted from the diffuser associated with the outlet 72 of the sixth channel 70 is devoted to ventilation towards the pilot's right foot.

Finally, the seventh and last channel 70 includes an outlet 72 equipped with a coupling 84 passing through the other lateral end of the module 22. A diffuser 86d, illustrated in FIG. 12, is situated at the end of this coupling. This diffuser 86d, preferably added after the assembly of the module 22 in the cockpit, is situated right of this module, being fastened to the cockpit framework. The air that is extracted from this diffuser 86d is devoted to demisting the right lateral windshield pane.

Of course, various modifications can be made by the person skilled in the art to the disclosure herein that has just been described only as non-limitative examples, and whose scope is defined by the attached claims.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A module for an aircraft cockpit, the module comprising an instrument panel to support at least one screen, and the module further comprising an air conditioning distribution block bordering the instrument panel and integral with a rear face of the instrument panel, the air conditioning distribution block comprising:
    an air distributor;
    an excess air collector;
    a plurality of air distribution channels each including a first end communicating with the air distributor and a second end communicating with the excess air collector, each distribution channel comprising an air outlet arranged between its first and second ends.

2. The module according to claim 1, wherein the air outlet of at least one of the air distribution channels is equipped with an airflow control valve.

3. The module according to claim 1, wherein the air outlet of at least one of the air distribution channels is connected to a coupling, and comprising an air diffuser, an air heater, or both and air diffuser and an air heater.

4. The module according to claim 1, wherein the air conditioning distribution block is configured to ensure at least one or more of:
    ventilation towards one or both of an area for feet of a pilot;
    ventilation towards an upper trunk and/or area for a head of the pilot;
    demisting of a windshield front pane;
    demisting of one or more windshield lateral panes.

5. The module according to claim 1, wherein the air distributor of the block and the excess air collector are adjacent to two lateral ends of the instrument panel.

6. The module according to claim 1, wherein the air distribution channels are stacked on top of each other along a direction of a height of the instrument panel and arranged between the air distributor and the excess air collector.

7. The module according to claim 1, wherein each air distribution channel has a curve substantially locally identical to a curve of the instrument panel.

8. The module according to claim 1, comprising a heat insulation cover of the air distribution block that is enclosed between the instrument panel and the heat insulation cover.

9. The module according to claim 8, wherein the air outlet of at least one of the air distribution channels is connected to a coupling, and comprising an air diffuser, an air heater, or both and air diffuser and an air heater, and wherein the heat insulation cover supports at least one air diffuser associated with at least one of the air distribution channels.

10. The module according to claim 8, wherein the air outlet of at least one of the air distribution channels is equipped with an airflow control valve, and wherein the heat insulation cover supports at least one motor for actuating at least one airflow control valve associated with at least one of the air distribution channels, each motor preferably being supported at an upper portion of the heat insulation cover.

11. The module according to claim 1, comprising an air intake port coupled with the air distributor, and an excess air outlet port coupled with the excess air collector.

12. The module according to claim 1, wherein the instrument panel and the air distribution block are made of a single piece.

13. An aircraft cockpit comprising a framework and a module according to claim 1, fastened to the cockpit framework and on a structural windshield frame.

14. An aircraft comprising a cockpit according to claim 13.

15. The aircraft according to claim 14, comprising a forward lower compartment under a cockpit floor and under a passenger cabin floor, the forward lower compartment housing electrical cabinets arranged at a rear with respect to an aft cockpit wall, and such that air escaping from the excess air collector of the cockpit module is fed into the forward lower compartment.

16. A method for assembling an aircraft cockpit, the aircraft cockpit comprising a framework and a module,
the module comprising an instrument panel to support at least one screen, and the module further comprising an air conditioning distribution block bordering the instrument panel and integral with a rear face of the instrument panel, the air conditioning distribution block comprising:
an air distributor;
an excess air collector; and
a plurality of air distribution channels each including a first end communicating with the air distributor and a second end communicating with the excess air collector, each distribution channel comprising an air outlet arranged between its first and second ends,
the method comprising a step of fastening the module onto the cockpit framework.

* * * * *